Dec. 3, 1940.  A. B. McLAUCHLAN  2,223,455
FRUIT AND VEGETABLE GRADER
Filed Nov. 21, 1938   2 Sheets-Sheet 1
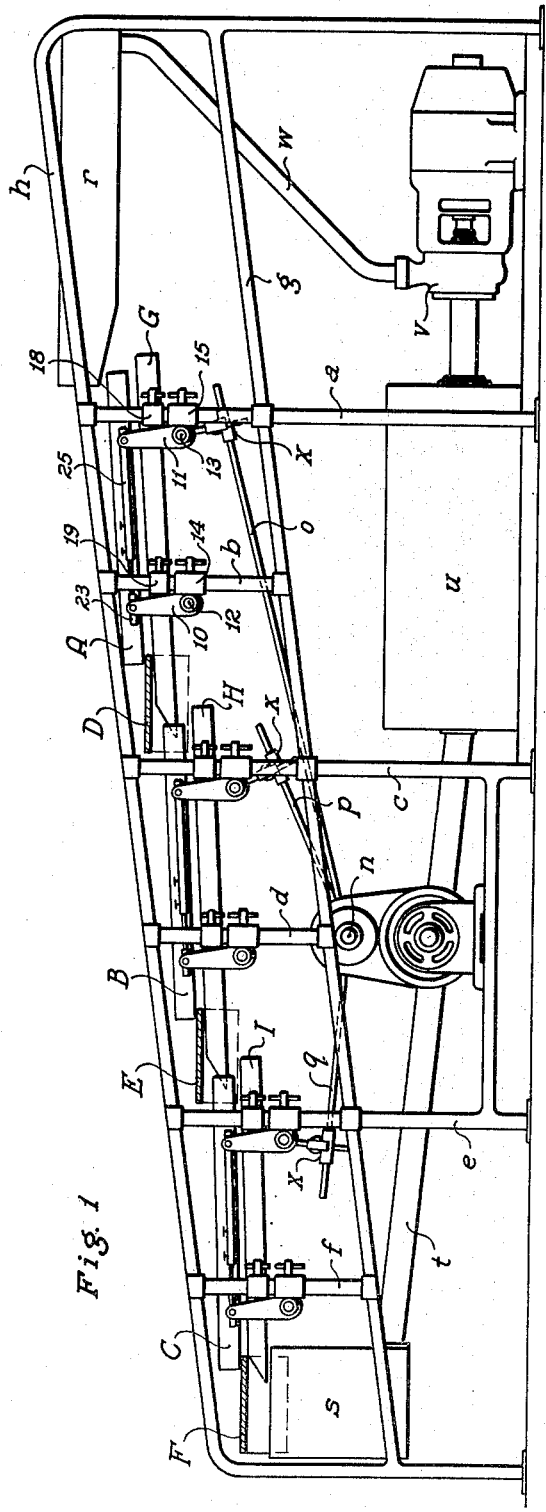
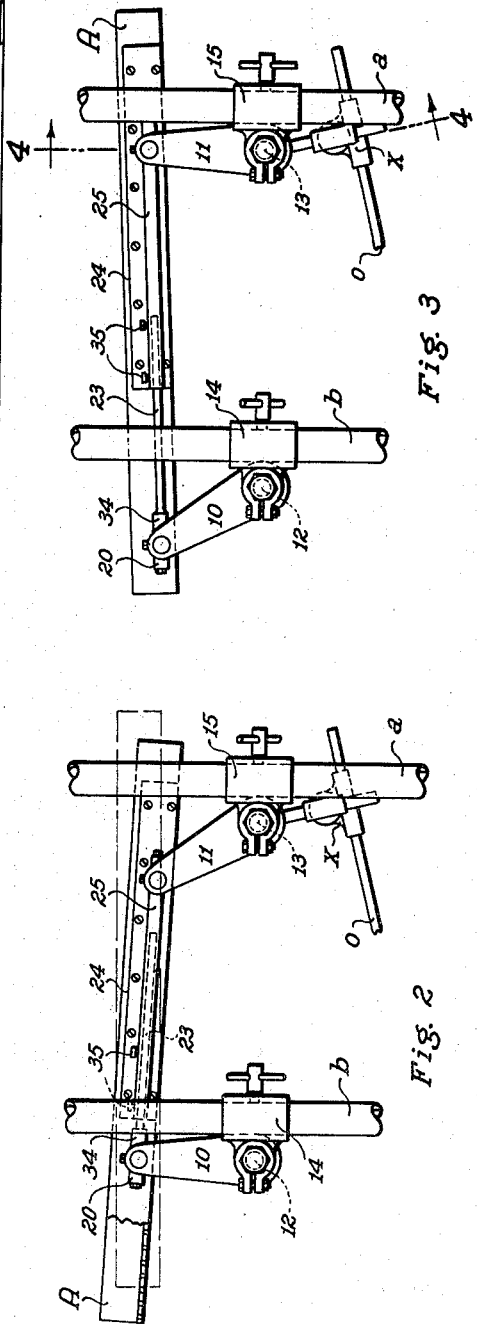
Inventor
Arthur B. McLauchlan
By T. J. Geisler and
F. R. Geisler.
Attorneys

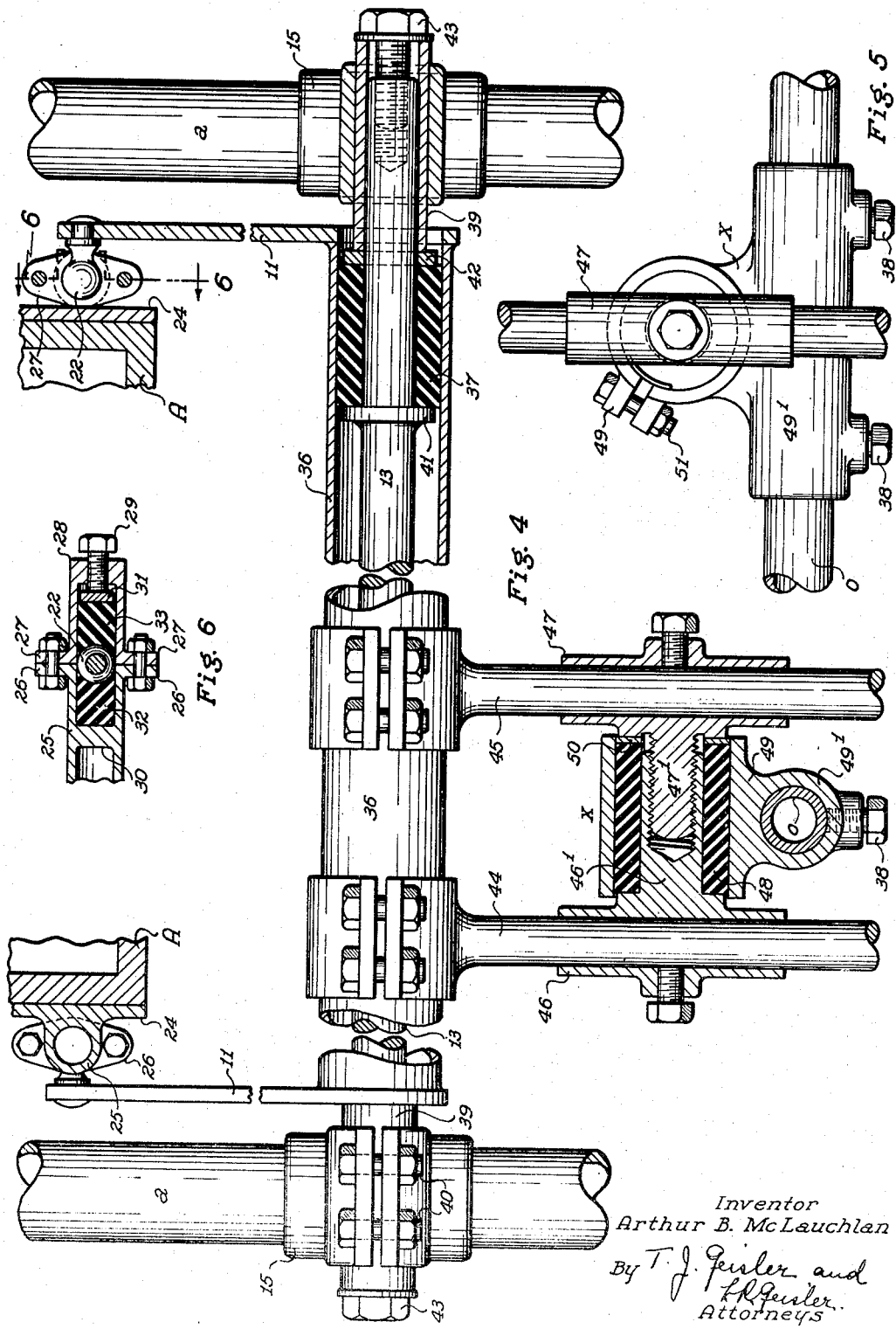

Patented Dec. 3, 1940

2,223,455

UNITED STATES PATENT OFFICE 2,223,455

FRUIT AND VEGETABLE GRADER

Arthur B. McLauchlan, Salem, Oreg.

Application November 21, 1938, Serial No. 241,526

7 Claims. (Cl. 209—314)

My invention relates primarily to an apparatus for grading or sorting fruits and vegetables, although it may be used also for devices adapted to the sorting of various other objects or materials into different sized lots.

The apparatus which I employ for carrying out the principles of my invention includes a plurality of shaker-trays, or shaking-grates, at different elevations and arranged in step formation in a supporting frame. However, I make the height of each end of each shaker-tray adjustable so as to be able not only to change the height of the entire tray but also, when desired, to vary the slope of the tray in either direction from the horizontal.

An important object of my invention is to provide improved agitating motion for shaking each tray, which motion will be a composite longitudinal and vertical oscillation and which can be varied for each end of the tray.

Another object of my invention is to provide cushioned oscillating bearings for the moving parts of the apparatus which will prevent the transmission of vibration to the supporting frame, which is one of the common faults found in devices of this class, and which will eliminate the objectionable noise generated when ordinary bearings are used with agitating means.

These objects and other advantages I achieve by mounting the shaker-trays in my apparatus and by providing cushioning oscillating bearings for various moving elements in the manner herein described with reference to the accompanying drawings.

In the drawings:

Fig. 1 is a schematic side elevation of a fruit and vegetable grader embodying the principles of my invention;

Figs. 2 and 3 are enlarged views of one of the shaker-trays and actuating mechanism of Fig. 1 illustrating certain important details in connection with the supporting and shaking arms and the means for adjusting the same;

Fig. 4 is a foreshortened, fragmentary, transverse section through the grader of Fig. 1, this view showing the operating mechanism of one shaker-tray partly in elevation and partly in vertical section, as indicated by line 4—4 of Fig. 3;

Fig. 5 is a side elevation of one of the parts shown in vertical section in Fig. 4; and Fig. 6 is a fragmentary sectional elevation on line 6—6 of Fig. 4.

Referring first to Fig. 1, the frame of the machine in the embodiment shown comprises at each side a series of vertical supports $a$, $b$, $c$, $d$, $e$, and $f$ connected to inclined frame members $g$ and $h$ which are joined to the vertical members in such manner as to form a rigid skeleton structure higher at one end than at the other. The posts $a$, $b$, $c$, $d$, $e$, and $f$ are preferably tubular in form and are spaced along the frame structure in pairs, one pair of posts at each side of each set of shaker-trays. These sets of trays constitute separate grading or sorting units and are arranged in step formation substantially as shown in Fig. 1. Any number of such units may be arranged in cooperative relationship in a single machine. Each grading unit comprises one shaker-tray and its actuating mechanism, a discharge belt and a stationary tray. In the three unit machine of Fig. 1, the shaker-trays are designated A, B, and C, the conveyor belts D, E and F and the stationary trays G, H and I. Since the construction of the several grading units is practically identical, the description of one set will be sufficient.

The shaker-tray A is of conventional form consisting of a shallow box-like structure open at the discharge end and provided with a slotted or perforated bottom, the size and disposition of these apertures depending upon the type of matter to be graded or sorted. The tray A is supported at each side, in manner to be later described, on the upper ends of a pair of arms 10 and 11 which are mounted on transverse shafts 12 and 13 carried at each end in brackets 14 and 15 slidably disposed on the tubular posts $b$ and $a$, respectively, and retained at the desired height thereon by set screws. Oscillatory motion is imparted to the shaft 13 by means of pitman rod $o$ connected to a motor driven crank shaft $n$, which causes the shaking of the tray A.

Each stationary tray G, H and I is also a shallow box-like structure open at one end but made longer than the shaker-trays A, B and C and has a water-tight bottom. Each of the stationary trays is supported at each side on brackets 18 and 19 slidably mounted on the vertical posts $a$ and $b$ and is locked in position thereon by suitable set screws. As shown in Fig. 1, the stationary trays G, H and I are disposed below the shaker-trays A, B and C, respectively, and the discharge ends of the stationary trays G and H lie immediately above the receiving end of the shaker-trays A and B while the last stationary tray I leads to a tank $s$. The conveyor belts D, E and F, which pass transversely through the frame of the machine, are located immediately below the discharge end of the shaker-trays A, B and C, respectively.

The machine illustrated in Fig. 1 is designed primarily for grading fruit or vegetables and as such is provided with means for supplying a constant stream of water to the trays to aid the passage of the fruit or vegetables and to wash the same. These means comprise a tank $r$ mounted on the frame with its discharge end above the receiving end of the first shaker-tray A, a tank $s$ located below the discharge end of the last stationary tray I, a pipe $t$ connecting the tank $s$ with a reservoir $u$ and a motor driven pump $v$ for drawing water from the reservoir $u$ and forcing it upwardly through a pipe $w$ to the tank $r$.

In operation, the material to be graded, for example fruit, is deposited in the tank $r$ and the tray-vibrating mechanism and pump started. The flow of the water from the tank $r$ carries the fruit to the first shaker-tray A where the fruit which is too large to pass through the apertures in the bottom of shaker-tray A is eventually shaken off the discharge end of that tray onto the conveyor belt D while the water and smaller fruit pass through the apertures into the stationary tray G and thence to the receiving end of the shaker-tray B. The apertures in the bottom of shaker-tray B are smaller than those of shaker-tray A. The fruit which does not pass through the apertures in shaker-tray B passes on to conveyor belt E. The smaller fruit passes into the stationary tray H and is then passed to the shaker-tray C, the apertures of which are still smaller.

The degree of inclination of the trays is an important factor in the efficiency of the grading operation and the provision of means for quickly and easily changing the height of either end of the shaker-trays and stationary trays is an important feature of my apparatus.

Each shaker-tray is supported by the two pairs of arms 10 and 11 in the manner illustrated in Figs. 2 and 3. A stationary tubular section 25 of a telescoping fixture is formed integrally with or rigidly secured to a plate 24 which in turn is fastened to each side of the shaker-tray. The arm 11 is pivotally connected near one end of this section, as shown in Figs. 2 and 3. The other arm 10 is pivotally connected to the telescoping or sliding member 23. The member 23 is held in the desired position by set screws 35. Thus the arms 10 and 11 need not be kept in the parallel relationship shown in Fig. 1, but the position of the arms 10 with respect to arms 11 may be varied, as illustrated in Figs. 2 and 3, mainly by adjusting the position of the telescoping member 23. This is a very important feature of my invention. In this way the shaking motion, being a component of horizontal and vertical oscillation, may be varied for each end of the shaker-tray. For example, referring to Fig. 2, assuming that the pitman $o$ is in the middle of its stroke, it is apparent that the arms 11 in oscillating through short arcs will impart considerably more vertical vibration to the rear end of the shaker-tray than occurs at the forward end through the medium of the arms 10; and similarly, in Fig. 3, it will be apparent that the reverse will occur, that is that more vertical vibration will be imparted to the forward end of the tray by the arms 10 than will be imparted to the other end by the arms 11. Thus the vibratory or shaking motion of the tray may be varied in innumerable ways to obtain most efficient action for the particular kind of fruit being handled.

The manner in which I construct the pivotal connections between the arms 11 and the stationary members 25 and between arms 10 and the telescoping members 23 will now be described with reference to Figs. 2, 3, 4 and 6. Each of the arms 10 and 11 has a ball member 22 rigidly attached at its upper end as shown in Fig. 4. The rear end of stationary member 25 has a pair of ears 26 (see Fig. 6) to which are bolted the corresponding ears 27 of the tubular cap 28. The tubular cap 28 has an adjusting screw 29 threaded through its closed end. The inner end of screw 29 bears against a slidable disk 31 within the cap. An integral partition 30 is formed within the stationary member 25 near its end. A plug 32 of resilient material, such as rubber, is placed between ball 22 and partition 30. A similar plug of resilient material 33 is placed in the cap 28. Thus the ball 22 is mounted in a resilient bearing and cushioning joint.

A similar mounting is provided at the outer end of telescoping member 23, this member being preferably enlarged, as shown at 34 in Figs. 2 and 3, and having a tubular cap 20, similar to cap 28 of Fig. 6, attached thereto.

The construction and mounting of the shafts 13 and 12, on which the arms 11 and 10, respectively, are carried is illustrated in Fig. 4, which shows one of the shafts 13, the construction of shafts 12 being identical.

The shaft 13 is made with an integral annular shoulder 41 spaced from each end. A hollow shaft 36 is carried by the shaft 13 and is supported at each end by a cylindrical bearing 37 of resilient material such as rubber. The arms 11 are rigidly secured to the ends of the hollow shaft 36. A metal washer 42 freely mounted on shaft 13 bears against the outer end of the resilient bearing 37. A sleeve 39, which is slit longitudinally, is placed on the end of shaft 13 and extends slightly beyond the end of shaft 13. A screw 43, threaded in the end of shaft 13, has a head which bears against the outer end of the split sleeve 39. Thus tightening of the screw 43 causes the sleeve 39 to be thrust against the washer 42 and resilient bearing 37. This axial compression of the resilient bearing 37 causes it to expand radially and prevent the rotation of the bearing 37 on the shaft 13 and the rotation of the hollow shaft 36 on the bearing 37. But, because of the flexibility or resiliency of the bearing 37, the hollow shaft 36, and with it the arms 11, can be given an oscillating motion through a small arc while the shaft 13 remains stationary. This spring-like action of the resilient bearing permits noiseless oscillation of the hollow shaft 36 with practically no vibration carried to the frame on which the stationary shaft 13 is supported. This is a very important feature of my invention. Furthermore, since there is no rotation one surface on another, there is very little wear on the resilient bearing.

The split sleeve 39 at each end of the shaft 13 is clamped in a bracket 15 by a pair of bolts 40 (Fig. 4), thus holding the shaft 13 against rotation. When it is desired to adjust the screw 43, to cause greater or less axial compression of the bearing 37, the bolts 40 are first loosened to permit the split sleeve 39 to slide on shaft 13.

A pair of arms 44 and 45 are firmly clamped on the hollow shaft 36 substantially as shown in Fig. 4 and a specially constructed knuckle joint $x$ connects these arms to the pitman rod $o$. The knuckle joint $x$ consists chiefly of two T-shaped sleeve members 46 and 47, a rubber or resilient bearing 48, and a clamping member 49. The sleeve members 46 and 47 are slidably disposed on the arms 44 and 45, respectively, and are each provided with a set screw for locking them in place. The laterally extending stem 47' of the sleeve 47 is threaded into the similar stem 46' of the sleeve 46. The thick, tubular bearing 48, of rubber or other resilient material, is tightly disposed on the stem 46' between suitable annular shoulders of the members 46 and 47, a washer 50 being interposed between the bearing 48 and shoulder of the member 47. The clamping member 49 encompasses the bearing 48 and is tightened by means of bolt 51 (see Fig. 5). This clamping member 49 has a sleeve-like lower portion 49' adapted to receive the pitman rod o and to be secured thereto by set screws 38, as shown in Figs. 4 and 5. The amount of arcuate movement transmitted to the shaft 36 by the reciprocating pitman o may of course be varied by changing the position of the sleeves 46 and 47 on the arms 44 and 45.

When assembling or adjusting the knuckle joint x, the joint is removed from the arms 44 and 45 and the member 47 is rotated with respect to member 46 so as to compress the resilient bearing 48. When the bolt 51 is tightened bearing 48 is prevented from rotating on the stem 46', but, due to the resiliency or flexibility of the bearing 48, the pitman-carrying member 49 can oscillate through a small arc in the same manner as hollow shaft 36.

Thus, by constructing the connections of the various operating parts of my grader in the manner explained, I eliminate noisy joints and the objectionable vibration of the frame of the machine. These resilient bearings require no lubrication other than an occasional dash of water which usually occurs without attention of the operator in machines using water for washing purposes.

Obviously, various arrangements of the trays and other component parts of my grader can be made without departing from the principles of my invention, and similarly minor modifications can be made in the construction of the resilient bearings which form an important feature in the grader. The particular construction which I have described and illustrated, however, I have found to be practical, simple, and satisfactory in every way.

I claim:

1. In a shaker mechanism of the character described, a pair of arms, said arms rigidly secured to a hollow shaft, a stationary supporting shaft within said hollow shaft, a tubular bearing of resilient material between said hollow shaft and said inner stationary shaft, whereby said hollow shaft will be permitted limited oscillation with respect to said inner stationary shaft without causing rotation of any bearing surfaces, said resilient bearing located entirely within said hollow shaft and spaced from the ends of said hollow shaft, adjustable means for axially compressing said resilient tubular bearing to cause it to tend to expand radially, whereby to adjust the pressure exerted by said bearing against the cylindrical bearing surfaces of said shaft and to modify the resiliency of said bearing.

2. In a shaker mechanism including a shaker tray, a pair of upright arms pivotally supporting an end of said tray, said arms rigidly secured to a hollow shaft, a stationary supporting shaft within said hollow shaft, a tubular bearing of rubber material between said hollow shaft and said inner stationary shaft, whereby said hollow shaft will be permitted limited oscillation with respect to said inner stationary shaft without causing rotation of any bearing surfaces, said tubular bearing located entirely within said hollow shaft and spaced from the ends of said hollow shaft, adjustable means for axially compressing said tubular bearing to cause it to tend to expand radially, whereby to adjust the pressure exerted by said bearing against the cylindrical bearing surfaces of said shafts and to modify the resiliency of said bearing.

3. In a device of the character described, a pair of upright frame members, a bracket on each member, a stationary transverse shaft supported by said brackets, a hollow shaft mounted on said stationary shaft between said brackets, a pair of parallel arms rigidly attached to said hollow shaft, a resilient tubular bearing located within said hollow shaft extending around said stationary shaft and spaced from the ends of said hollow shaft, means carried on said stationary shaft for producing axial compression of said resilient bearing, whereby limited oscillation may be imparted to said arms and said arms will always be in transverse alinement with each other, but the axial compression of said bearing will act to prevent relative movement between any adjacent bearing surfaces.

4. The combination set forth in claim 3 with said means for producing axial compression of said resilient bearing comprising a shoulder on said stationary shaft engaging the inner end of said bearing, a split sleeve on the end of said stationary shaft, the inner end of said sleeve extending into said hollow shaft and engaging the outer end of said bearing, and an adjusting screw on the end of said stationary shaft engaging the outer end of said sleeve.

5. In an oscillating mechanism an outer member, a cylindrical inner member extending within said outer member, a tubular bearing of resilient material interposed between said members located entirely within said outer member and spaced from the ends of said outer member, a shoulder on said inner member engaging one end of said tubular bearing, a third member carried by said inner member, said third member having a stem threaded into said inner member and a shoulder extending into said outer member engaging the other end of said bearing, whereby said bearing will be compressed between said shoulders so as to permit only limited oscillation of said outer member with respect to said other members.

6. In a device of the character described, including a plurality of shaker trays in step formation, a longitudinally-extending frame having upright members on opposite sides, adjustable brackets on said members, transversely extending stationary shafts having their ends supported in said brackets, a hollow shaft mounted on each transverse stationary shaft between its supporting brackets, a pair of parallel tray-supporting arms rigidly attached to each hollow shaft, a resilient tubular bearing in each hollow shaft extending around the stationary shaft, means for producing axial compression of said resilient bearing, whereby limited oscillation may be imparted to the hollow shaft and its parallel arms without relative movement between any adjacent bearing faces, a pair of said arms supporting each end of each of said trays and pivotally connected to said trays respectively, and means for imparting oscillatory motion to said trays.

7. The combination set forth in claim 6 with said stationary shafts adjustably supported in said brackets and with the connection between each tray and one pair of its supporting arms being adjustable and so arranged and constructed that said one pair of arms may be moved into or out of parallelism with the other pair of arms of said tray in order to vary the oscillatory motion imparted to such tray.

ARTHUR B. McLAUCHLAN.